(12) United States Patent
Nashizawa

(10) Patent No.: US 8,736,737 B2
(45) Date of Patent: May 27, 2014

(54) IMAGE PROCESSING APPARATUS, IMAGE PROCESSING METHOD, AND STORAGE MEDIUM

(75) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/368,052

(22) Filed: Feb. 7, 2012

(65) Prior Publication Data

US 2012/0212644 A1 Aug. 23, 2012

(30) Foreign Application Priority Data

Feb. 21, 2011 (JP) ................................. 2011-035177
Jan. 25, 2012 (JP) ................................. 2012-013430

(51) Int. Cl.
*G02B 13/16* (2006.01)
*H04N 5/225* (2006.01)

(52) U.S. Cl.
USPC ......................................................... 348/335

(58) Field of Classification Search
USPC ................. 348/252, 253, 335, 340, 345, 348; 382/254, 255, 266
See application file for complete search history.

(56) References Cited

U.S. PATENT DOCUMENTS 6,914,628 B1 * 7/2005 Kuwata et al. ................ 348/272

FOREIGN PATENT DOCUMENTS

| CN | 1479529 A | 3/2004 |
|---|---|---|
| CN | 100481864 C | 4/2009 |
| CN | 101420626 A | 4/2009 |
| EP | 1 981 285 A1 | 10/2008 |
| JP | 2000-299874 | 10/2000 |
| JP | 2006-020275 | 1/2006 |

OTHER PUBLICATIONS

Ed Chang, Shiufun Cheung and Davis Pan, Color Filter Array Recovery Using a Threshold-Based Variable Number of Gradients, Proc. SPIE, vol. 3650, pp. 36-43, Jan. 1999.
The above references were cited in a Jan. 21, 2014 Chinese Office Action, which is enclosed with an English Translation, that issued in Chinese Patent Application No. 201210041459.7.

* cited by examiner

*Primary Examiner* — Yogesh Aggarwal
(74) *Attorney, Agent, or Firm* — Cowan, Liebowitz & Latman, P.C.

(57) ABSTRACT

An image processing apparatus comprises edge detection unit, on-axis chromatic aberration edge detection unit which detects an edge determined to include chromatic aberration on an axis from the edges, color deviation amount acquisition unit which acquires color deviation amounts on the edges, and correction unit which performs chromatic aberration correction, wherein the on-axis chromatic aberration edge detection unit detects, as the edge which includes the chromatic aberration on the axis, an edge having signals corresponding to at least one color on the edge of the image data, which has a blur amount that is not less than a threshold value, and signals corresponding to at least another color which has a blur amount that is less than the threshold value, and the color deviation amount acquisition unit acquires the color deviation amounts from edges among the edges.

7 Claims, 10 Drawing Sheets

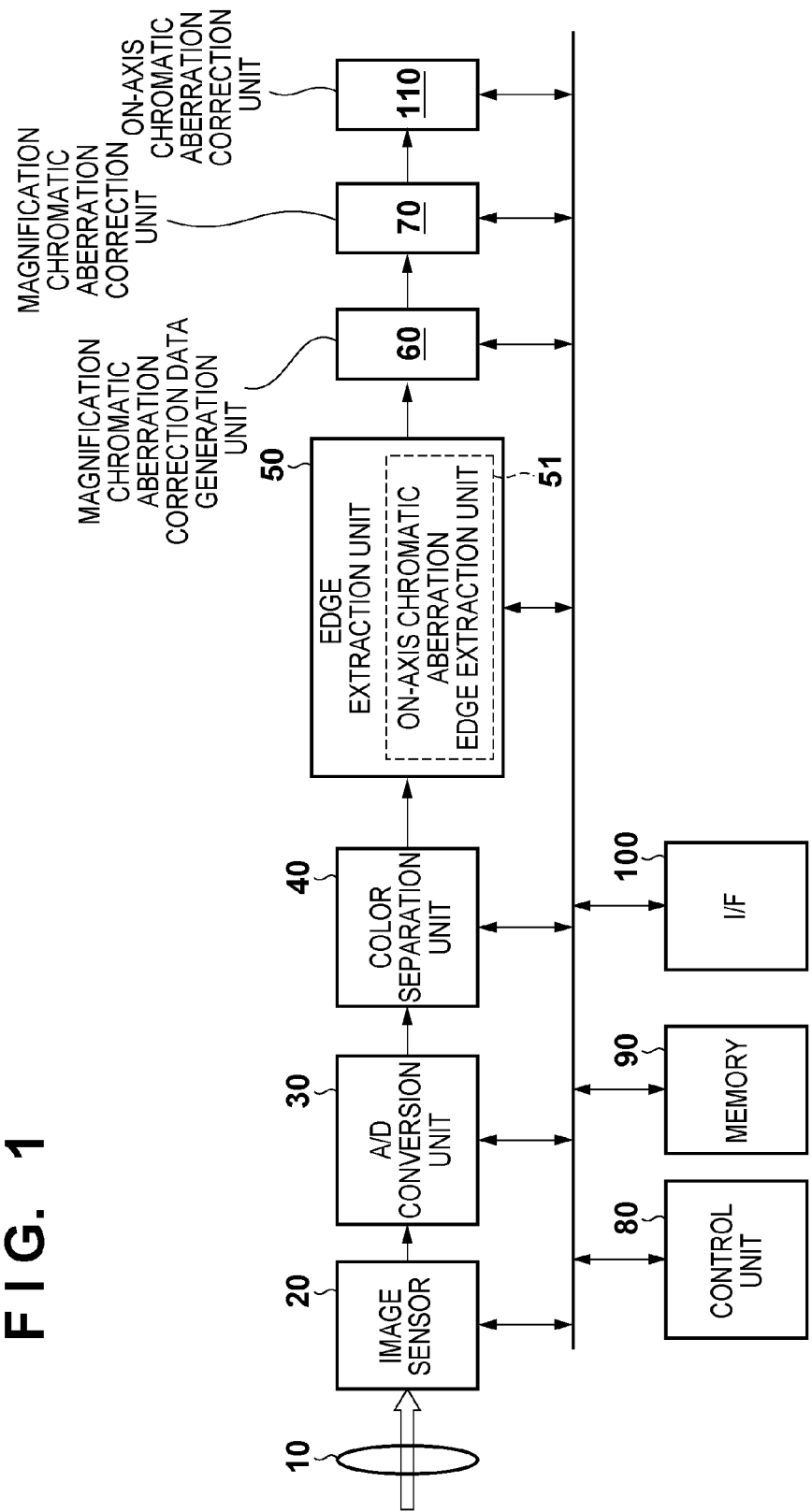

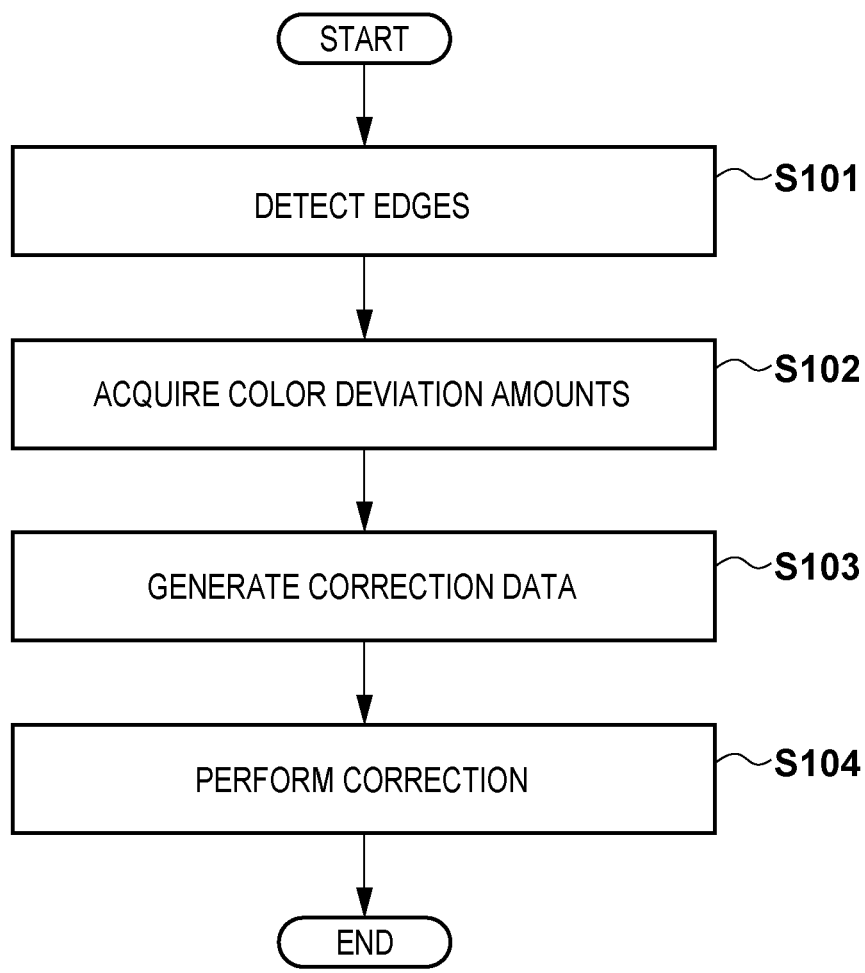

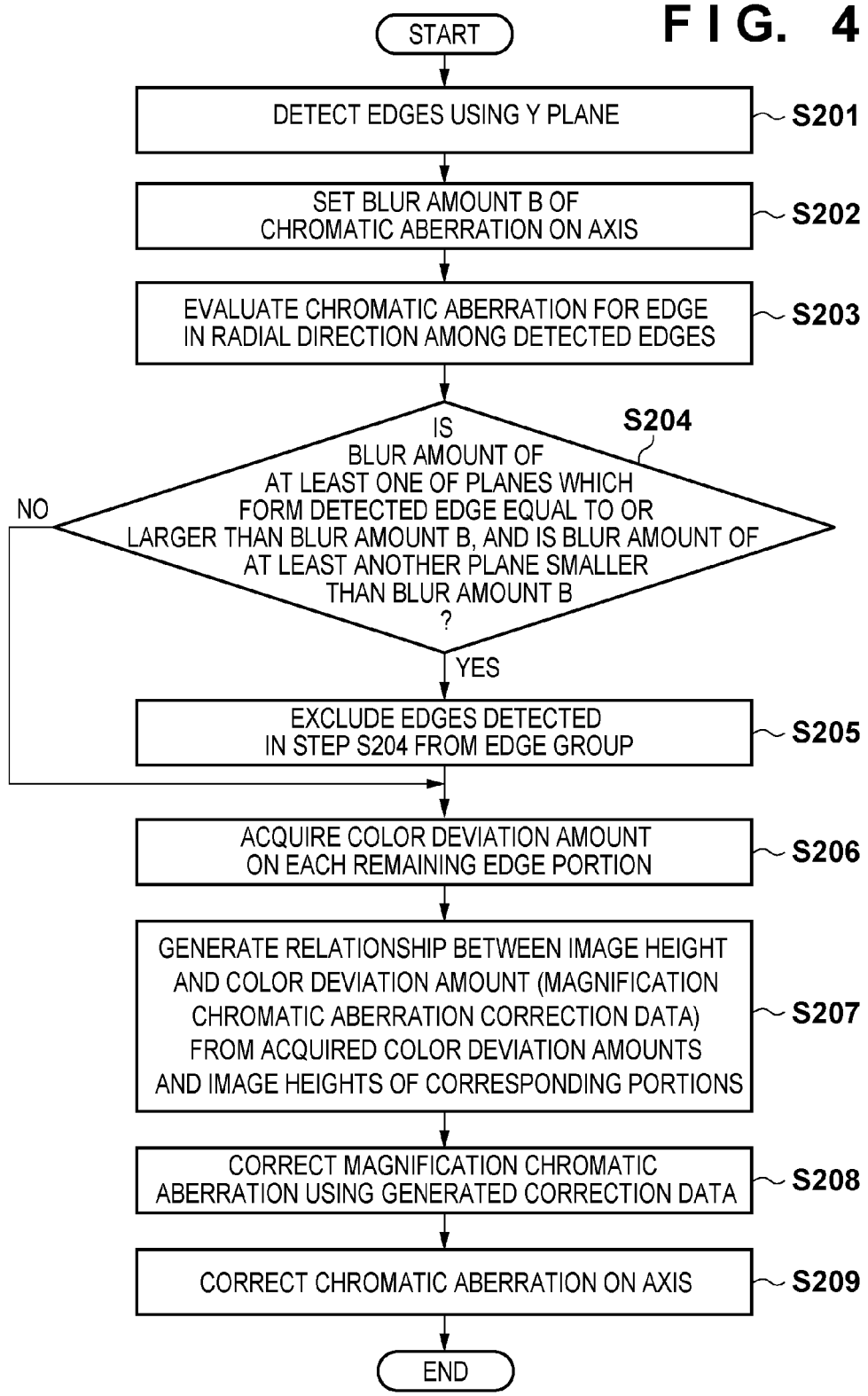

BLUR AMOUNT

FIG. 6A

| LENS ID 28-200mm | | | |
|---|---|---|---|
| OBJECT DISTANCE (m) | F-NUMBER | FOCAL LENGTH | BLUR AMOUNT (μm) |
| 10 | 3.5 | 28 | 158 |
| 10 | 4 | 28 | 143 |
| 10 | 4.5 | 28 | 122 |
| 10 | 5 | 28 | 111 |
| 10 | 5.6 | 28 | 96 |
| 10 | 6.3 | 28 | 77 |
| 10 | 7.1 | 28 | 65 |
| 10 | 8 | 28 | 49 |
| 10 | 9 | 28 | 36 |
| 10 | 10 | 28 | 21 |
| 10 | 11 | 28 | 9 |
| 10 | 13 | 28 | 6 |
| 10 | 14 | 28 | 3 |
| 10 | 16 | 28 | 2 |
| 10 | 18 | 28 | 1 |
| 10 | 20 | 28 | 1 |
| 10 | 22 | 28 | 1 |
| 10 | 25 | - | - |
| 10 | 29 | - | - |
| 10 | 32 | - | - |
| 10 | 36 | - | - |
| 10 | 3.5 | - | - |
| 10 | 4 | 35 | 156 |
| 10 | 4.5 | 35 | 144 |
| 10 | 5 | 35 | 121 |
| 10 | 5.6 | 35 | 113 |
| 10 | 6.3 | 35 | 92 |
| 10 | 7.1 | 35 | 76 |
| 10 | 8 | 35 | 57 |
| 10 | 9 | 35 | 40 |
| 10 | 10 | 35 | 22 |
| 10 | 11 | 35 | 9 |
| 10 | 13 | 35 | 6 |
| 10 | 14 | 35 | 3 |
| 10 | 16 | 35 | 2 |
| 10 | 18 | 35 | 1 |
| 10 | 20 | 35 | 1 |
| 10 | 22 | 35 | 1 |
| 10 | 25 | 35 | 1 |
| 10 | 29 | - | - |
| 10 | 32 | - | - |
| 10 | 36 | - | - |

FIG. 6B

| LENS ID 28-200mm |||| 
|---|---|---|---|
| OBJECT DISTANCE (m) | F-NUMBER | FOCAL LENGTH | BLUR AMOUNT (μm) |
| 10 | 3.5 | - | - |
| 10 | 4 | - | - |
| 10 | 4.5 | 50 | 165 |
| 10 | 5 | 50 | 149 |
| 10 | 5.6 | 50 | 130 |
| 10 | 6.3 | 50 | 107 |
| 10 | 7.1 | 50 | 86.6 |
| 10 | 8 | 50 | 64.6 |
| 10 | 9 | 50 | 43.2 |
| 10 | 10 | 50 | 22.6 |
| 10 | 11 | 50 | 9.4 |
| 10 | 13 | 50 | 6 |
| 10 | 14 | 50 | 3 |
| 10 | 16 | 50 | 2 |
| 10 | 18 | 50 | 1 |
| 10 | 20 | 50 | 1 |
| 10 | 22 | 50 | 1 |
| 10 | 25 | 50 | 1 |
| 10 | 29 | 50 | 1 |
| 10 | 32 | - | - |
| 10 | 36 | - | - |
| 10 | 3.5 | - | - |
| 10 | 4 | - | - |
| 10 | 4.5 | - | - |
| 10 | 5 | 70 | 169 |
| 10 | 5.6 | 70 | 147 |
| 10 | 6.3 | 70 | 122 |
| 10 | 7.1 | 70 | 97.4 |
| 10 | 8 | 70 | 72.4 |
| 10 | 9 | 70 | 46.8 |
| 10 | 10 | 70 | 23.4 |
| 10 | 11 | 70 | 9.6 |
| 10 | 13 | 70 | 6 |
| 10 | 14 | 70 | 3 |
| 10 | 16 | 70 | 2 |
| 10 | 18 | 70 | 1 |
| 10 | 20 | 70 | 1 |
| 10 | 22 | 70 | 1 |
| 10 | 25 | 70 | 1 |
| 10 | 29 | 70 | 1 |
| 10 | 32 | - | - |
| 10 | 36 | - | - |

FIG. 6C

| LENS ID 28-200mm | | | |
|---|---|---|---|
| OBJECT DISTANCE (m) | F-NUMBER | FOCAL LENGTH | BLUR AMOUNT (μm) |
| 10 | 3.5 | - | - |
| 10 | 4 | - | - |
| 10 | 4.5 | - | - |
| 10 | 5 | - | - |
| 10 | 5.6 | 135 | 147 |
| 10 | 6.3 | 135 | 122 |
| 10 | 7.1 | 135 | 97.4 |
| 10 | 8 | 135 | 72.4 |
| 10 | 9 | 135 | 46.8 |
| 10 | 10 | 135 | 23.4 |
| 10 | 11 | 135 | 9.6 |
| 10 | 13 | 135 | 6 |
| 10 | 14 | 135 | 3 |
| 10 | 16 | 135 | 2 |
| 10 | 18 | 135 | 1 |
| 10 | 20 | 135 | 1 |
| 10 | 22 | 135 | 1 |
| 10 | 25 | 135 | 1 |
| 10 | 29 | 135 | 1 |
| 10 | 32 | 135 | 1 |
| 10 | 36 | 135 | 1 |
| 10 | 3.5 | - | - |
| 10 | 4 | - | - |
| 10 | 4.5 | - | - |
| 10 | 5 | - | - |
| 10 | 5.6 | 200 | 181 |
| 10 | 6.3 | 200 | 152 |
| 10 | 7.1 | 200 | 119 |
| 10 | 8 | 200 | 88 |
| 10 | 9 | 200 | 54 |
| 10 | 10 | 200 | 25 |
| 10 | 11 | 200 | 10 |
| 10 | 13 | 200 | 6 |
| 10 | 14 | 200 | 3 |
| 10 | 16 | 200 | 2 |
| 10 | 18 | 200 | 1 |
| 10 | 20 | 200 | 1 |
| 10 | 22 | 200 | 1 |
| 10 | 25 | 200 | 1 |
| 10 | 29 | 200 | 1 |
| 10 | 32 | 200 | 1 |
| 10 | 36 | 200 | 1 |

IMAGE PROCESSING APPARATUS, IMAGE PROCESSING METHOD, AND STORAGE MEDIUM

BACKGROUND OF THE INVENTION

1. Field of the Invention

The present invention relates to a technique of performing chromatic aberration correction of an image.

2. Description of the Related Art

Image capture apparatuses that employ imaging lenses, such as a digital camera, are used for various purposes. A light beam that has passed through an imaging lens has a refractive index in the imaging lens, which varies depending on its wavelength. Hence, even in light reflected by the same object, the distances from the imaging positions, on an image sensor, of light beams contained in the reflected light to the center of the optical axis on the image sensor differ depending on the wavelengths of these light beams. Such magnification chromatic aberration generates a color deviation, that is, a variation in imaging position in each individual color, so a color which is absent on the object under normal circumstances is generated in an image, thus leading to degradation in quality.

Since the number of pixels of an image sensor used increases each year, and the unit pixel size reduces, even a magnification chromatic aberration that is rarely problematic in the conventional techniques has become conspicuous. As a technique of correcting such a color deviation by image processing, a technique of acquiring the color deviation amount from an image to compensate for this color deviation amount has been proposed.

Japanese Patent Laid-Open Nos. 2000-299874 and 2006-020275, for example, disclose the following techniques. First, processing of obtaining the sum total of the differences in signal level between color components in each pixel after the position of image data formed by one color component is moved relative to that of image data formed by another color component is repeated on an edge portion. The moving amount of the position of image data formed by one color component relative to that of image data formed by another color component when the sum total of the differences in signal level between the color components minimizes is obtained to obtain a correction amount by which the color deviation amount minimizes.

However, in the method of acquiring a correction amount using the sum total of the differences in signal level between the color components as mentioned above, a precise correction amount for a color deviation due to magnification chromatic aberration often cannot be acquired on an edge portion on which not only magnification chromatic aberration but also a blur resulting from chromatic aberration on the axis is generated.

FIG. 9A shows changes in signal level of image data of color components of red (R), green (G), and blue (B) in a portion in which chromatic aberration on the axis is generated. Referring to FIG. 9A, due to the chromatic aberration on the axis, the correlation between the image data of the B color component and the image data of the G (or R) color component is lower than that between the image data of the R color component and the image data of the G color component. This is because the correlations between image data of a specific color component and image data of the remaining color components are lower in the portion in which chromatic aberration on the axis is generated than in the portion in which only magnification chromatic aberration is generated.

Hence, when a correction amount on an edge portion including chromatic aberration on the axis is obtained using the above-mentioned method, the color phase of the edge portion may change before and after correction.

FIG. 9B shows the state in which a correction amount is obtained using the sum total of the differences in signal level between the color components, and correction is performed using this correction amount, in the portion in which chromatic aberration on the axis is generated. Assume, for example, that a G plane serving as image data formed by a G color component and an R plane serving as image data formed by an R color component have no color deviation, and the G plane and a B plane serving as image data formed by a B color component have a color deviation, as shown in FIG. 9A. To minimize the difference in signal level between the color components on the B plane and the G (or R) plane, a region in which the signal level is higher on the B plane than on the G plane, and that in which the signal level is higher on the G plane than on the B plane mix with each other. Especially when the correlations of the B plane to the planes of the remaining color components are low, a region in which the difference in signal level between the B and G planes is large is present. For example, a portion corresponding to a hatched portion in FIG. 9A is in yellow, but a portion corresponding to a hatched portion in FIG. 9B is in another color, blue due to excessive correction, so the observer feels a great sense of discomfort upon a comparison between the color phases of the edge portion before and after correction. A method of relieving the observer's sense of discomfort by adjusting the color phase of the edge portion after correction is available, but it may deteriorate the original color structure of the object.

SUMMARY OF THE INVENTION

The present invention has been made in consideration of the above-mentioned problem, and makes it possible to effectively correct magnification chromatic aberration by keeping the probability of excessive correction lower than the conventional methods in correcting chromatic aberration on the axis by image processing.

According to the first aspect of the present invention, there is provided an image processing apparatus comprising: edge detection unit configured to detect edges from image data formed by signals corresponding to a plurality of colors; on-axis chromatic aberration edge detection unit configured to detect an edge determined to include chromatic aberration on an axis from the edges; color deviation amount acquisition unit configured to acquire color deviation amounts on the edges; and correction unit configured to perform chromatic aberration correction using correction amounts based on the color deviation amounts, wherein the on-axis chromatic aberration edge detection unit detects, as the edge which includes the chromatic aberration on the axis, an edge having signals corresponding to at least one color on the edge of the image data, which has a blur amount that is not less than a threshold value, and signals corresponding to at least another color which has a blur amount that is less than the threshold value, and the color deviation amount acquisition unit acquires the color deviation amounts from edges, that are different from the edge detected by the on-axis chromatic aberration edge detection unit, among the edges.

According to the second aspect of the present invention, there is provided an image processing method comprising the steps of: using edge detection unit to detect edges from image data formed by signals corresponding to a plurality of colors; using on-axis chromatic aberration edge detection unit to detect an edge determined to include chromatic aberration on an axis from the edges; using color deviation amount acquisition unit to acquire color deviation amounts on the edges;

and using correction unit to perform chromatic aberration correction using correction amounts based on the color deviation amounts, wherein the on-axis chromatic aberration edge detection unit detects, as the edge which includes the chromatic aberration on the axis, an edge having signals corresponding to at least one color on the edge of the image data, which has a blur amount that is not less than a threshold value, and signals corresponding to at least another color which has a blur amount that is less than the threshold value, and the color deviation amount acquisition unit acquires the color deviation amounts from edges, that are different from the edge detected by the on-axis chromatic aberration edge detection unit, among the edges.

Further features of the present invention will become apparent from the following description of exemplary embodiments with reference to the attached drawings.

BRIEF DESCRIPTION OF THE DRAWINGS

FIG. 1 is a block diagram showing an image processing apparatus according to an embodiment of the present invention;

FIG. 2 is a flowchart showing processing by the image processing apparatus according to the embodiment;

FIG. 4 is a flowchart showing magnification chromatic aberration correction processing and on-axis chromatic aberration correction processing;

FIGS. 6A, 6B, and 6C are tables showing on-axis axis chromatic aberration information tables;

DESCRIPTION OF THE EMBODIMENTS

Figure 3A:
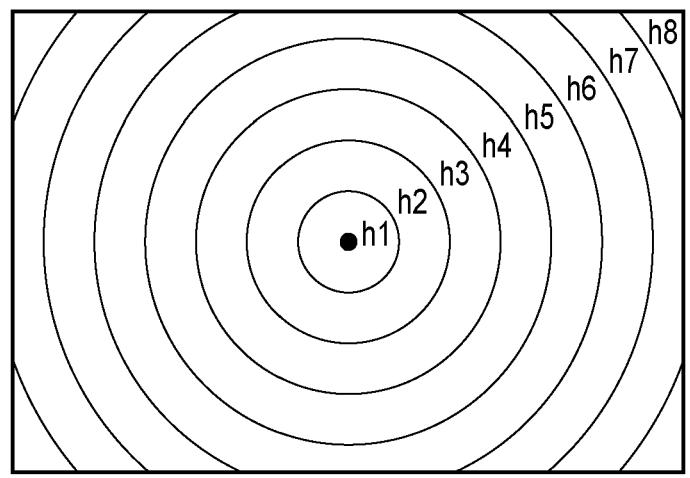
FIGS. 3A and 3B are views showing regions divided for each image height, and correction data.

An embodiment of the present invention will be described below. Even when target color planes are not particularly referred to in the following description, both correction of a color deviation between the G and R planes, and correction of a color deviation between the G and B planes can similarly be performed using the following method.

Also, although an image processing apparatus including an imaging system such as a digital camera is used in this embodiment, the present invention is applicable to image data which is formed by a plurality of color planes and is captured by the imaging system using an imaging lens such as a digital camera. Hence, a target image according to the present invention is limited to none of RAW data and JPEG data after development processing. It is also possible to practice the present invention using an image processing apparatus other than a digital camera after image data captured by, for example, a digital camera is read using the image processing apparatus. Therefore, an image processing apparatus according to the present invention need not always include an imaging lens.

The processing overview in which an image processing apparatus which performs magnification chromatic aberration correction generates magnification chromatic aberration correction data from an image, and corrects the image will be described first.

FIG. 1 is a block diagram showing an image processing apparatus according to an embodiment of the present invention. The image processing apparatus includes an imaging optical system 10, an image sensor 20, an A/D conversion unit 30, a color separation unit 40, an edge extraction unit 50 including an on-axis chromatic aberration edge extraction unit (on-axis chromatic aberration edge detection unit) 51, a magnification chromatic aberration correction data generation unit 60, a magnification chromatic aberration correction unit 70, an on-axis chromatic aberration correction unit 110, a control unit 80, a memory 90, and an I/F 100.

Referring to FIG. 1, light from an object passes through the imaging optical system 10, and forms an image on the image sensor 20 which photoelectrically converts an object image. The image sensor 20 is a single-plate color image sensor including a general primary color filter. The primary color filter includes three types of color filters having main pass bands around 650 nm, 550 nm, and 450 nm, and captures color planes corresponding to respective bands of R (Red), G (Green), and B (Blue) (generates image data formed by signals corresponding to a plurality of colors). In the single-plate color image sensor, it is possible only to spatially array these types of color filters for each pixel, and obtain the light intensity on each color plane in each pixel. Therefore, the image sensor 20 outputs color mosaic image data.

The A/D conversion unit 30 converts color mosaic image data output from the image sensor 20 as an analog voltage into digital data suitable for subsequent image processing. The color separation unit 40 interpolates the color mosaic image data to generate color image data having R, G, and B color information in all pixels.

Although various interpolation methods for this interpolation have been proposed in a wide range from simple linear interpolation to a complex method as described in literature "E. Chang, S. Cheung, and D. Pan, "Color filter array recovery using a threshold-based variable number of gradients," Proc. SPIE, vol. 3650, pp. 36-43, January 1999", the present invention does not limit the interpolation method.

The edge extraction unit 50 including the on-axis chromatic aberration edge extraction unit 51 detects an edge (edge portion) from color image data generated by the color separation unit 40. Based on the detected edge information, the magnification chromatic aberration correction data generation unit 60 generates magnification chromatic aberration correction data from the image data. The magnification chromatic aberration correction unit 70 performs magnification chromatic aberration correction using the generated magnification chromatic aberration correction data. Image data used in each processing unit, and data such as capture time information are stored in the memory 90, and the control unit 80 controls this processing unit. Also, depending on circumstances involved, an external operation such as a user instruction is input to the image processing apparatus via the I/F (interface) 100.

FIG. 2 is a flowchart showing a magnification chromatic aberration correction operation by the image processing apparatus according to this embodiment, and illustrates the sequence of processing by the edge extraction unit 50 including the on-axis chromatic aberration edge extraction unit 51, the correction data generation unit 60, and the correction unit 70. Magnification chromatic aberration correction by the image processing apparatus according to this embodiment will be explained below with reference to each step described in FIG. 2.

First, in edge detection step S101, edges on each of which a color deviation due to magnification chromatic aberration conspicuously appears are detected from image data. The Y (luminance) plane is used for edge detection. In this case, edges to be detected are limited to edges on each of which the pixel value greatly changes outwards from a reference, which is assumed to be a position that coincides with the center of the optical axis on the image sensor, thereby acquiring accurate color deviation amounts. Also, a color deviation due to magnification chromatic aberration appears as a blur, so an edge having a certain width so that a monotonic increase or monotonic decrease in signal level continues over a plurality of pixels is desirably targeted.

In color deviation amount acquisition step S102, a color deviation amount is acquired on each edge detected in edge detection step S101. Although several methods of acquiring color deviation amounts are available, color deviation amounts can typically be acquired using, for example, the above-mentioned method. This means that processing of moving the position of image data on one color plane relative to that of image data on another plane, and obtaining the sum total of the differences in signal level between the color components is repeatedly performed on each edge portion. The moving amount of the position of image data of one color component relative to that of image data of another color component when the sum total of the differences in signal level between the color components minimizes is obtained to obtain a correction amount so as to minimize the color deviation amount.

Based on the positional relationship between the optical center and each edge, the upward/downward direction, right/left direction, obliquely upward right/obliquely downward left direction, or obliquely upward left/obliquely downward right direction is adopted as the direction of a color deviation herein, for the sake of simple processing.

The color deviation amount serving as an output in color deviation amount acquisition step S102 has a negative value when the R plane (or B plane) is shifted toward the optical center with respect to the G plane. However, this color deviation amount has a positive value when the R plane (or B plane) is shifted in a direction opposite to the optical center with respect to the G plane. In this case, in acquiring a color deviation amount, a method of measuring the degree of coincidence of each plane while this plane is shifted, and estimating a color deviation amount is adopted. However, at this time, if a given edge includes chromatic aberration on the axis, a situation in which a point having a high degree of coincidence does not always serve as a point of a color deviation due to magnification chromatic aberration occurs, thus degrading the color deviation amount acquisition accuracy. Hence, on-axis chromatic aberration evaluation is performed using the blur amounts of the R, G, and B planes on each detected edge, and an edge evaluated to have chromatic aberration on the axis is excluded. This makes it possible to improve the color deviation amount acquisition accuracy in color deviation amount acquisition step S102. Processing according to this embodiment is applied to detection of an edge including chromatic aberration on the axis, and will be described in detail later with reference to FIG. 4.

In correction data generation step S103, correction data is generated by obtaining the relationship between the image height and the color deviation based on the image height of each edge detected in edge detection step S101, and the color deviation amount on each edge acquired in color deviation amount acquisition step S102. The image height mentioned herein means the distance from the position (to be simply referred to as the optical center hereinafter) of a pixel located on the optical axis of the imaging lens to the pixel of interest.

A correction data generation procedure will be described in detail below.

(1) A color deviation ratio M of a color deviation amount D acquired in color deviation amount acquisition step S102 with respect to an image height L of each edge detected in edge detection step S101 is obtained as:

$$M = D/L$$

(2) Image data is divided into eight regions h1 to h8 for each image height, as shown in FIG. 3A, to select a region to which each of the above-mentioned edges belongs.

(3) The above-mentioned operations (1) and (2) are performed for a plurality of edges detected in the image data, the color deviation ratios M are added up for each of the eight regions divided for each image height, and the average of the color deviation ratios M is obtained for each region, thereby determining the color deviation ratio in each region.

Figure 3B:
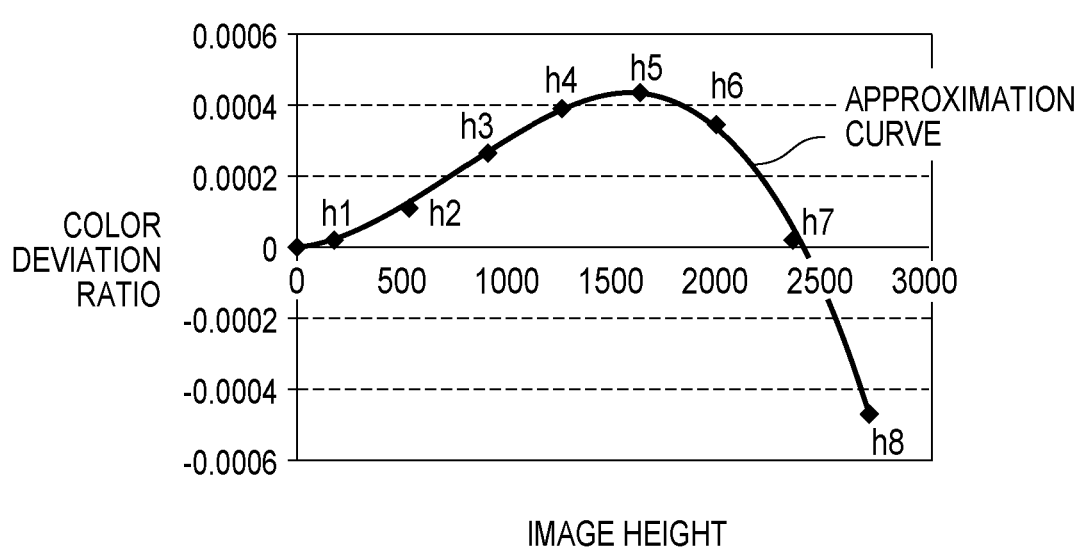

(4) A high-order polynomial approximation equation F(l) representing the relationship between the image height and the color deviation ratio is calculated from the image height and the obtained color deviation ratio to determine the calculation result as correction data, as shown in FIG. 3B. FIG. 3B illustrates an example in which correction data is calculated using a third-order polynomial.

Note that edge detection and color deviation amount acquisition may be performed for all edges in the image data. However, the processing efficiency can be improved while maintaining a given reliability by, for example, ending edge detection and color deviation amount acquisition when color deviation ratios in a number equal to or larger than a predetermined threshold value are added up in each of the eight regions divided for each image height.

Also, when only a region in which a corresponding edge is detected among the eight regions divided for each image height is used to calculate a high-order polynomial approximation equation, correction data can be generated even if a region in which no corresponding edge is detected is present.

In correction step S104, the color deviation is corrected using the correction data generated in correction data generation step S103. That is, the color deviation is corrected by moving the position of image data of at least one of a plurality of color planes.

First, a color deviation ratio M is obtained from an image height L of a pixel (X, Y) in each plane to be corrected (R and B planes) as:

$$M = F(L)$$

Note that a coordinate system having the optical center as (0, 0) is used.

A coordinate position (X1, Y1) of a pixel generated by color deviation correction is obtained by:

$$X1 = X + M \times X$$

$$Y1 = Y + M \times Y$$

The signal level of a pixel corresponding to the coordinate position (X1, Y1) on each plane to be corrected is generated by interpolation processing, in which the signal levels of surrounding pixels are added as weights, and is determined as the signal level of the pixel (X, Y). These operations are done for all pixels to perform color deviation correction.

The processing overview in which magnification chromatic aberration correction data is generated from an image, and the image is corrected has been described above.

Magnification chromatic aberration correction and on-axis chromatic aberration correction processing according to this embodiment will be described in detail below with reference to a flowchart shown in FIG. 4.

Edge detection that uses the Y plane in edge detection step S201 will be described first. A Y plane signal is generated from R, G, and B plane signals generated by the color separation unit 40 first. A Y plane signal is generated using:

$$Y=0.299R+0.587G+0.114B$$

Edge detection is performed for the Y plane defined in this equation. Although several edge detection methods are available, detection is done using the following method in this embodiment. Since an edge is a portion in which the signal level rapidly changes, differentiation in which a change in function is extracted can be used for edge detection. When a first-order derivative (gradient) is used, the value of a first-order derivative representing the gradient of the signal level at a coordinate position (x, y) is expressed as a vector quantity having a magnitude and a direction $G(x, y)=(fx, fy)$, and fx and fy are calculated by:

Derivative in x Direction: $fx=f(x+1,y)-f(x,y)$

Derivative in y Direction: $fy=f(x,y+1)-f(x,y)$

Therefore, the edge intensity is calculated by:

$\sqrt{(fx^2+fy^2)}$ or $|fx|+|fy|$

The edge intensity is also calculated using a second-order derivative L(x, y) (Laplacian) as:

$L(x,y)=|4 \cdot f(x,y)-\{f(x,y-1)+f(x,Y+1)+f(x-1,y)+f(x+1,y)\}|$

Image data obtained by performing edge detection on the Y plane using the above-mentioned method has a density corresponding to the edge intensity. In this case, a predetermined threshold value Th1 is set, and a pixel having a signal value larger than the threshold value Th1 is detected as an edge. As a reference to set the threshold value Th1, a value according to which chromatic aberration can be detected as an edge need only be set.

Figure 5A:
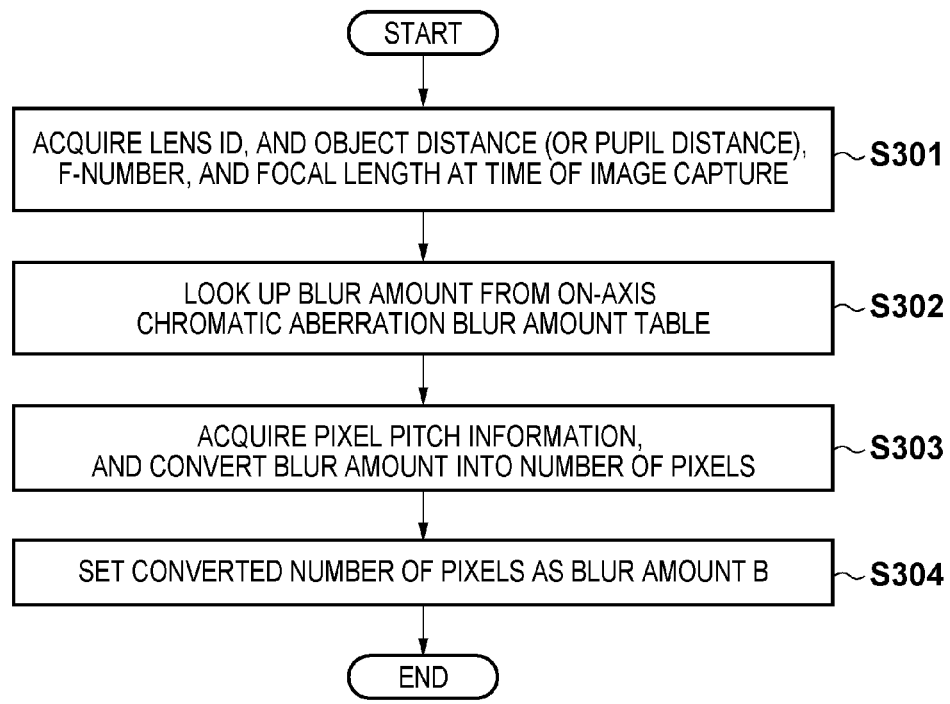
FIGS. 5A, 5B, and 5C are views illustrating an example of a method of setting the blur amount of chromatic aberration on the axis, a chart used to generate a blur, and a captured image.

In step S202, to detect chromatic aberration on the axis from each detected edge, a blur amount Th2 of the chromatic aberration on the axis is set. Step S202 will be described in detail with reference to FIG. 5A.

Figure 5B:
Figure 5C:
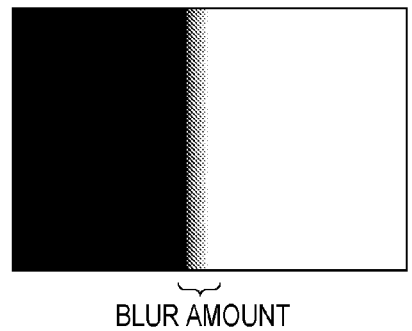

First, as a precondition, blur amount information of chromatic aberration on the axis under various image capture conditions needs to be prepared in advance in the form of a table, and stored on the memory 90 shown in FIG. 1. Chromatic aberration on the axis generates a blur in an amount which varies depending on various image capture conditions such as the type of lens, the object distance (or pupil distance), the F-number, and the focal length. Therefore, under various image capture conditions, charts are captured, and the generated blur amounts are measured. Although any chart may be captured, an edge having a monochrome chart with high contrast, as shown in, for example, FIG. 5B, can be used. FIG. 5C illustrates an example of the result of capturing the chart shown in FIG. 5B. When chromatic aberration on the axis is generated, a blur is naturally generated, as shown in FIG. 5C. The blur amount on that edge is measured. A list of the results of measuring the blur amounts while changing the image capture conditions in the same way is held as a table (table information) for each type of lens and each image capture condition, as shown in FIGS. 6A-6C.

Referring back to FIG. 5A, first, in step S301, the lens ID, the object distance (or pupil distance), the F-number at the time of image capture, the focal length, and the on-axis chromatic aberration blur amount table are acquired from the memory 90 shown in FIG. 1. In step S302, a blur amount corresponding to the image capture conditions is looked up from the on-axis chromatic aberration blur amount table. If the image capture conditions do not completely coincide with table data, a blur amount is obtained by interpolation calculation from approximate data. In step S303, the obtained blur amount is divided by the pixel pitch to convert this blur amount into the number of pixels in which a blur is generated. Lastly, in step S304, the converted number of pixels having a blur is set as a blur amount Th2. Hence, a value which varies in each individual image capture condition is set as the blur amount Th2 serving as a threshold value.

Figure 7A:
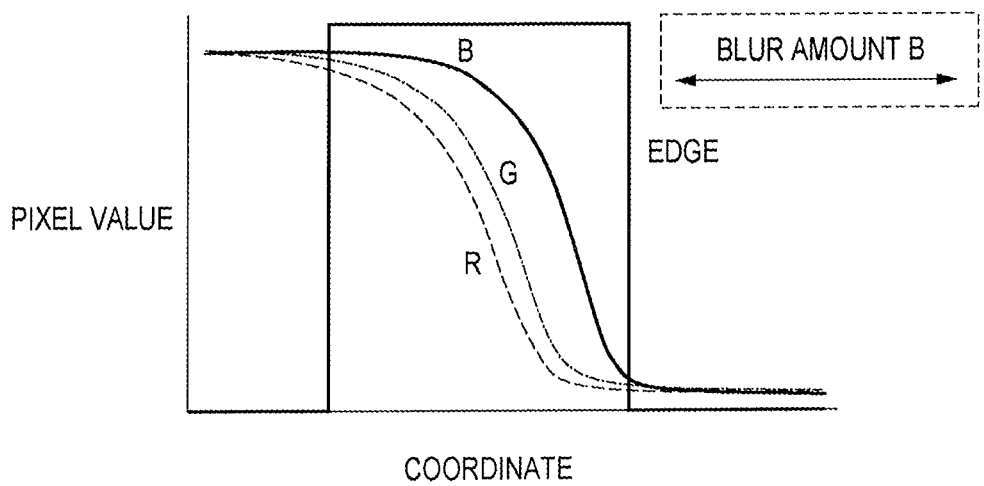
FIGS. 7A and 7B are graphs showing the relationships between edges and the blur amount.

To continuously detect chromatic aberration on the axis from each detected edge, in step S203 chromatic aberration evaluation is performed for an edge radially extending with reference to the optical center. Step S203 will be described in detail. FIG. 7A shows a detected edge, the R, G, and B planes on this edge, and the width of the set blur amount Th2. Monotonic increase/decrease determination is performed for a plane having a highest signal level (the B plane in this case) among the R, G, and B planes in this edge region. Chromatic aberration has a feature that its signal level gradually changes from a highlight portion to a shadow portion, that is, its signal level changes with a monotonic increase or a monotonic decrease. Therefore, if it is determined that a detected edge has a feature that its signal level monotonically increases or monotonically decreases, it can be evaluated that this edge is expected to include chromatic aberration. This produces an effect of preventing erroneous determination for an object with no chromatic aberration, which changes moderately in a broad area, but changes locally considerably.

In step S204, on-axis chromatic aberration evaluation is performed for the edge evaluated as an edge expected to include chromatic aberration. Signal level monotonic increase/decrease determination is performed for the R, G, and B planes in the edge region, and the blur amount on each plane is measured. The blur amount is the distance by which the signal level continuously changes with a monotonic increase or a monotonic decrease in successive pixels. Chromatic aberration on the axis is generated because one of the R, G, and B planes has a blur amount that is considerably different from those on the remaining planes. On the other hand, if all the planes have nearly the same blur amount, the detected edge is expected to be a normal edge or an edge including only magnification chromatic aberration at a high probability. Accordingly, an edge which satisfies the following two conditions is evaluated as an edge including chromatic aberration on the axis.

(1) At least one of the color planes which form the detected edge has a blur amount equal to or larger than the blur amount Th2 serving as a threshold value.

(2) At least another one of the color planes which form the detected edge has a blur amount smaller than the blur amount Th2 serving as a threshold value.

Figure 7B:
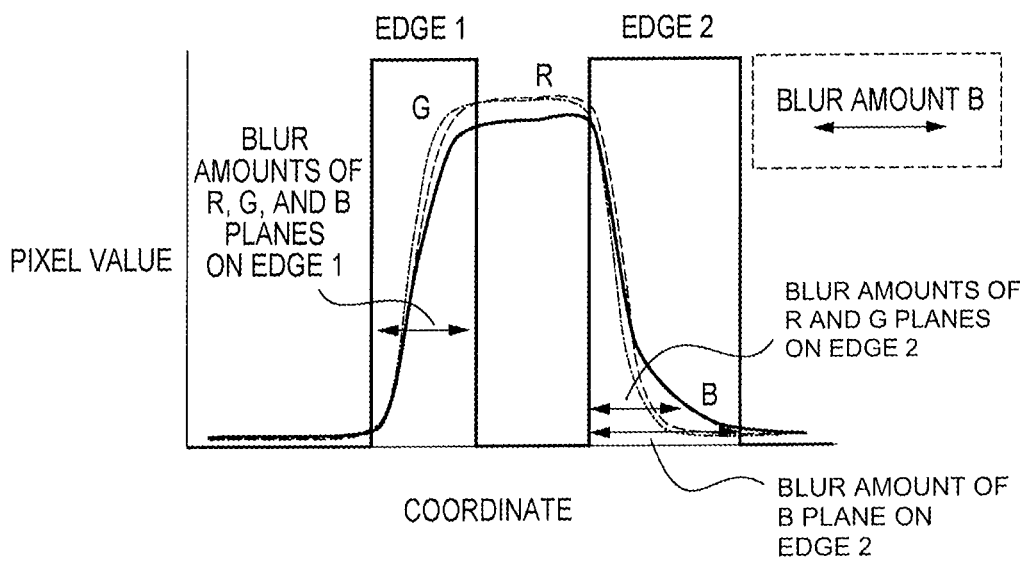

In an example shown in FIG. 7B, all of the R, G, and B planes on edge 1 have blur amounts smaller than the blur amount Th2, so edge 1 is evaluated as an edge expected to include no chromatic aberration on the axis at a high probability. Also, the R and G planes on edge 2 have blur amounts larger than the blur amount Th2, and the B plane on edge 2 has a blur amount smaller than the blur amount Th2, so edge 2 is evaluated as an edge expected to include chromatic aberration on the axis at a high probability. By the above-mentioned evaluation, the edge can be divided in accordance with the presence/absence of chromatic aberration on the axis.

In step S205, the edges detected in step S204 are excluded from the edge group detected in step S201, and edges which are not excluded are held as edges for color deviation amount acquisition.

Edge detection step S101 has been described above. In this way, the color deviation amount acquisition accuracy can be improved not only by normal edge detection but also by excluding edges including chromatic aberration on the axis.

In step S206, a color deviation amount is acquired on each of the remaining edge portions. In step S207, magnification chromatic aberration correction data representing the relationship between the image height and the color deviation amount is generated from the acquired color deviation amounts and the image heights of corresponding portions. In step S208, magnification chromatic aberration is corrected using the magnification chromatic aberration correction data. Lastly, in step S209, the chromatic aberration on the axis is corrected. Although several on-axis chromatic aberration correction methods are available, a method of reducing the color difference of a pixel in which chromatic aberration on the axis is generated, for example, is typically used. For example, upon defining a value obtained for Y–R and Y–B or G–R and G–B as a color difference, the signal level of a pixel in which chromatic aberration on the axis is generated need only be corrected so as to reduce the value of this color difference.

Although the on-axis chromatic aberration edge extraction unit 51 has been described by taking, as an example, determination that the distance by which the signal level continuously changes with a monotonic increase or a monotonic decrease in successive pixels is defined as a blur amount, the present invention is not limited to this.

Figure 8:
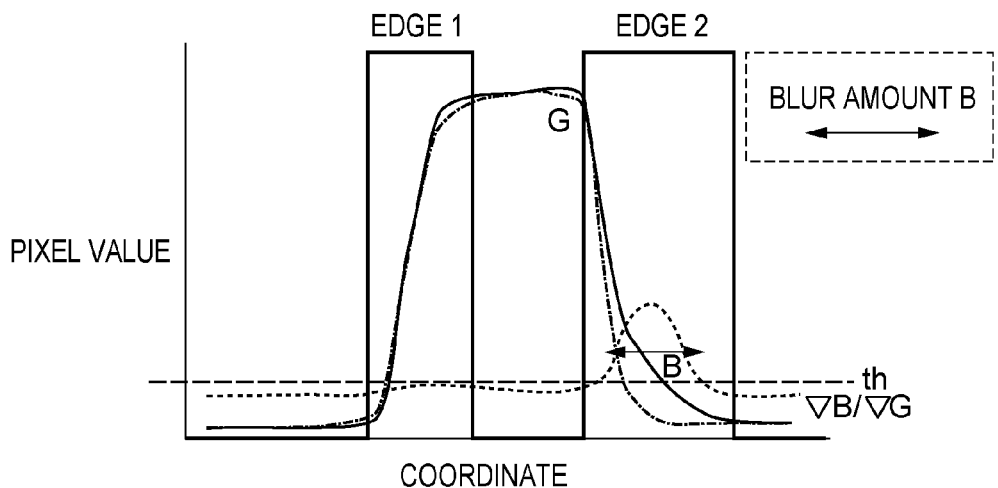
FIG. 8 is a graph showing the relationship between the gradients of edges and the blur amount.
Figure 9A:
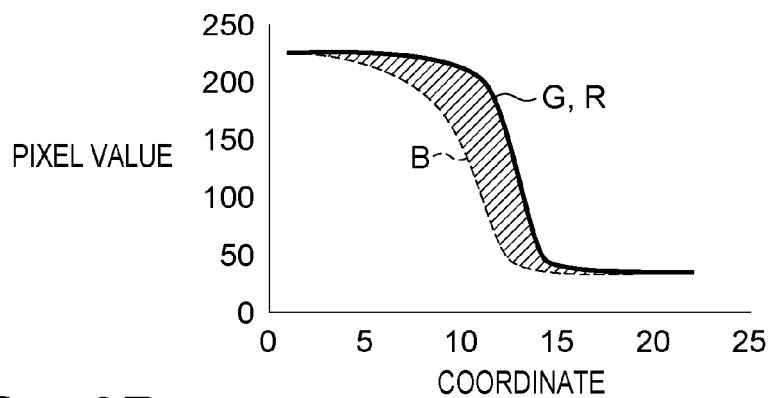
FIGS. 9A and 9B are graphs showing color deviations on edge portions.
Figure 9B:
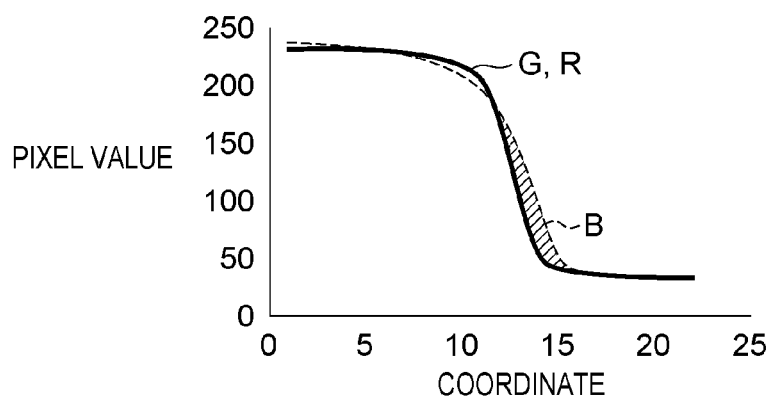

In a region having edges as shown in, for example, FIG. 8, the gradient ratio of each pixel is calculated by:

$$GradRatioBG = \Delta B / \Delta G$$

$$GradRatioRG = \Delta R / \Delta G$$

The gradient $\Delta B$ is calculated by:

$$\Delta B_i = |B_{i-1} - B_{i+1}|$$

where $B_i$ is the signal level of the pixel of interest, and $B_{i-1}$ and $B_{i+1}$ are the signal levels of pixels adjacent to the pixel having the signal level $B_i$. $\Delta R$ and $\Delta G$ are calculated by similar calculation equations. The interval of pixels, in which the gradient ratio calculated in the above-mentioned equations continuously exceeds a threshold value Th3, is determined as a blur amount. Chromatic aberration on the axis is generated because one of the R, G, and B planes has a blur amount that is considerably different from those on the remaining planes. On the other hand, if all the planes have nearly the same blur amount, the detected edge is expected to be a normal edge or an edge including only magnification chromatic aberration at a high probability. Accordingly, an edge which satisfies the following two conditions is determined as an edge including chromatic aberration on the axis.

(1) At least one of the color planes which form the detected edge has a blur amount equal to or larger than the blur amount Th3 serving as a threshold value.

(2) At least another one of the color planes which form the detected edge has a blur amount smaller than the blur amount Th3 serving as a threshold value.

In an example shown in FIG. 8, all of the R, G, and B planes on edge 1 have blur amounts smaller than the blur amount Th3, so edge 1 is evaluated as an edge expected to include no chromatic aberration on the axis at a high probability. Also, the R and G planes on edge 2 have blur amounts smaller than the blur amount Th3, and the B plane on edge 2 has a blur amount larger than the blur amount Th3, so edge 2 is evaluated as an edge expected to include chromatic aberration on the axis at a high probability. By the above-mentioned evaluation, the edge can be divided in accordance with the presence/absence of chromatic aberration on the axis.

Although preferred embodiments of the present invention have been described in detail above, the present invention is not limited to these specific embodiments, and various modes are included in the present invention without departing from the scope of the present invention. Also, some of the above-described embodiments may be combined as needed.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-035177, filed Feb. 21, 2011 and 2012-013430, filed Jan. 25, 2012, which are hereby incorporated by reference herein in their entirety.

What is claimed is:

1. An image processing apparatus comprising:
    an edge detection unit configured to detect edges from image data formed by signals corresponding to a plurality of colors;
    an on-axis chromatic aberration edge detection unit configured to detect an edge determined to include chromatic aberration on an axis from the edges;
    a color deviation amount acquisition unit configured to acquire color deviation amounts on the edges; and
    correction unit configured to perform chromatic aberration correction using correction amounts based on the color deviation amounts,
    wherein said on-axis chromatic aberration edge detection unit detects, as the edge which includes the chromatic aberration on the axis, an edge having signals corresponding to at least one color on the edge of the image data, which has a blur amount that is not less than a threshold value, and signals corresponding to at least another color which has a blur amount that is less than the threshold value, and
    said color deviation amount acquisition unit acquires the color deviation amounts from edges, that are different from the edge detected by said on-axis chromatic aberration edge detection unit, among the edges.

2. The apparatus according to claim 1, wherein said color deviation amount acquisition unit acquires a color deviation amount based on a sum total of differences between signal levels of signals corresponding to one color and signal levels of signals corresponding to another color on each of the edges.

3. The apparatus according to claim 1, wherein the blur amount is a distance by which a signal level continuously changes with one of a monotonic increase and a monotonic decrease in successive pixels.

4. The apparatus according to claim 1, wherein a threshold value according to which the chromatic aberration on the axis is evaluated is set for each of a plurality of image capture conditions held in advance.

5. The apparatus according to claim 4, wherein the image capture conditions include at least one of a type of imaging lens used, an object distance, a pupil distance, an F-number, and a focal length, when the image data is generated.

6. An image processing method comprising the steps of:
using edge detection unit to detect edges from image data formed by signals corresponding to a plurality of colors;
using on-axis chromatic aberration edge detection unit to detect an edge determined to include chromatic aberration on an axis from the edges;
using color deviation amount acquisition unit to acquire color deviation amounts on the edges; and
using correction unit to perform chromatic aberration correction using correction amounts based on the color deviation amounts,
wherein the on-axis chromatic aberration edge detection unit detects, as the edge which includes the chromatic aberration on the axis, an edge having signals corresponding to at least one color on the edge of the image data, which has a blur amount that is not less than a threshold value, and signals corresponding to at least another color which has a blur amount that is less than the threshold value, and
the color deviation amount acquisition unit acquires the color deviation amounts from edges, that are different from the edge detected by the on-axis chromatic aberration edge detection unit, among the edges.

7. A non-transitory computer-readable storage medium storing a program for causing a computer to function as each unit of an image processing apparatus defined in claim 1.

* * * * *